(12) United States Patent
Fang et al.

(10) Patent No.: US 12,305,369 B2
(45) Date of Patent: May 20, 2025

(54) NETWORKED ECOLOGICAL CONSERVATION WATER-SAVING SYSTEM FOR URBAN MASS GREEN LAND

(71) Applicant: Institute of Geographic Sciences and Natural Resources Research, CAS, Beijing (CN)

(72) Inventors: Chuanglin Fang, Beijing (CN); Jun Xia, Beijing (CN); Bing Zhang, Beijing (CN); Xiaoling Zhang, Beijing (CN); Jun Wan, Beijing (CN); Chundong Gao, Beijing (CN); Beili Fan, Beijing (CN); Shengli Zhen, Beijing (CN)

(73) Assignee: Institute of Geographic Sciences and Natural Resources Research, CAS, Beijing (CN)

(*) Notice: Subject to any disclaimer, the term of this patent is extended or adjusted under 35 U.S.C. 154(b) by 166 days.

(21) Appl. No.: 18/264,339

(22) PCT Filed: Feb. 24, 2022

(86) PCT No.: PCT/CN2022/077776
§ 371 (c)(1),
(2) Date: Aug. 4, 2023

(87) PCT Pub. No.: WO2022/179579
PCT Pub. Date: Sep. 1, 2022

(65) Prior Publication Data
US 2024/0035261 A1    Feb. 1, 2024

(30) Foreign Application Priority Data

Feb. 25, 2021    (CN) .......................... 202110211075.4

(51) Int. Cl.
*E03B 3/02*    (2006.01)
*A01G 25/06*    (2006.01)

(52) U.S. Cl.
CPC ................ *E03B 3/02* (2013.01); *A01G 25/06* (2013.01)

(58) Field of Classification Search
CPC .................................. E03B 3/02; A01G 25/06
See application file for complete search history.

(56) References Cited

U.S. PATENT DOCUMENTS

2018/0368341 A1    12/2018  Wang et al.

FOREIGN PATENT DOCUMENTS

| CN | 104594445 A | * | 5/2015 |
| CN | 106717413 A |   | 5/2017 |

(Continued)

OTHER PUBLICATIONS

International Search Report corresponding to PCT Application No. PCT/CN2022/077776, mailed May 23, 2022 (Chinese and English language document) (7 pages).

*Primary Examiner* — Kyle Armstrong
(74) *Attorney, Agent, or Firm* — Maginot, Moore & Beck, LLP

(57) ABSTRACT

The present disclosure relates to a networked ecological conservation water-saving system for urban mass green land, comprising 5-9 ecological conservation water-saving devices which are orderly arranged in the urban green land per square meter. The ecological conservation water-saving devices are arranged in a central symmetry manner. Each ecological conservation water-saving device comprises a columnar housing and an infiltrating irrigation unit. A first water storage unit is provided at the center of each infiltrating irrigation unit, and a second water storage unit is provided at the lower part of each first water storage unit. The networked ecological conservation water-saving system (Continued)

further comprises a first water delivery pipe network, a second water delivery pipe network, and a third water delivery pipe network.

10 Claims, 4 Drawing Sheets

(56) References Cited

FOREIGN PATENT DOCUMENTS

| | | | | |
|---|---|---|---|---|
| CN | 106717963 A | | 5/2017 | |
| CN | 107869151 A | * | 4/2018 | |
| CN | 108755902 A | | 11/2018 | |
| CN | 108978784 A | * | 12/2018 | ............. C02F 3/301 |
| CN | 109372080 A | * | 2/2019 | ............ E01C 11/227 |
| CN | 109629666 A | * | 4/2019 | ............... E03B 3/02 |
| CN | 110924261 A | * | 3/2020 | |
| CN | 110972824 A | | 4/2020 | |
| CN | 111305345 A | * | 6/2020 | ............. C02F 3/046 |
| CN | 112840998 A | | 5/2021 | |
| CN | 112982559 A | | 6/2021 | |
| GB | 2507967 A | * | 5/2014 | ............... E03B 3/02 |
| JP | 2010-126929 A | | 6/2010 | |

* cited by examiner

NETWORKED ECOLOGICAL CONSERVATION WATER-SAVING SYSTEM FOR URBAN MASS GREEN LAND

CROSS-REFERENCE TO RELATED APPLICATIONS

This application is based on and claims priority to Chinese Patent Application No. 202110211075.4, filed on Feb. 25, 2021, the entire disclosure of which is incorporated herein by reference for all purposes.

FIELD

The present disclosure relates to fields such as garden maintenance, rainwater collection and utilization, and sponge city construction, and more particularly to a networked ecological conservation water-saving system for urban mass green land.

BACKGROUND

With the acceleration of urbanization, urban green land, as an important green infrastructure, has important ecological functions in improving the urban ecological environment quality, mitigating urban heat island effect, regulating rain and flood, and adjusting the urban ecological balance.

The grass in conventional green land has shallow roots, and its requirement for water is mainly satisfied by surface irrigation. Under normal maintenance conditions, the typical water consumption of turfgrass per day is 2.5 to 7.5 mm, with a maximum of 12 mm. Lawn irrigation water has become an important way to use water for many urban landscape facilities. Water has become the main environmental factor that restricts turfgrass's formation, growth, and maintenance of green color. The limited amount of natural water resources and the extremely uneven spatial and temporal distribution greatly limit the establishment of green lawns and increase the difficulty of maintenance. For the conventional green land, water may infiltrate or drain away during rainfall or irrigation after the soil water is saturated, which further aggravates the waste of water resources.

On the one hand, the current urban green land maintenance consumes a lot of water and requires high irrigation frequency, resulting in high maintenance costs and serious waste of water resources. On the other hand, 66% of the annual rainfall in the city is concentrated in four months from June to September. During this period, the rainfall is frequent and heavy, and most of the rainfall is discharged by surface runoff since there is no enough time for the rainwater to infiltrate, resulting in waste of rainwater resources. The utilization of rainwater in urban green land is particularly important, which cannot only effectively prevent waterlogging, purify surface runoff, reduce non-point source pollution, but also conserve groundwater, making it close to the original natural ecosystem, and allow the city and nature to be better integrated.

For the established green land, it needs to be completely re-laid if the water-saving performance of the green land is rebuilt, which involves huge amount of workload and high costs. Consequently, how to solve the problem of water conservation and maintenance of the green land is one of the important issues for the current development of conservation-oriented cities.

SUMMARY

An objective of the present disclosure to propose a networked ecological conservation water-saving system for urban mass green land, to significantly shorten irrigation time and frequency, reduce irrigation water consumption, and solve problems of conventional green land irrigation, such as high water consumption, resource waste, high maintenance frequency and high maintenance costs.

To achieve the above objective, the present disclosure provides a networked ecological conservation water-saving system for urban mass green land. The networked ecological conservation water-saving system includes five to nine ecological conservation water-saving devices arranged orderly in per square of the urban mass green land and distributed in a centrosymmetric manner. The ecological conservation water-saving device includes: a columnar housing with an overall cross-section shaped in a regular hexagon, an upper part of the columnar housing being provided with an infiltrating irrigation unit, a first water storage unit being arranged in a center of the infiltrating irrigation unit, and a lower part of the first water storage unit being provided with at least one second water storage unit sequentially connected to the first water storage unit; a first water delivery pipe network connected to the first water storage unit; a second water delivery pipe network connected to the second water storage unit; and a third water delivery pipe network arranged within the infiltrating irrigation unit. The infiltrating irrigation unit includes: an outer layer with an outer profile shaped in a regular hexagon and with a top corner protruding outwards; and an inner layer of a hollow cylinder with a geometric center of a hexagonal shape as a circle. The infiltrating irrigation unit is divided into six radiant irrigation zones by perpendicular lines from a geometric center of a cross-section to six sides of the regular hexagon, and a grille is provided between two adjacent radiant irrigation zones. The infiltrating irrigation unit is provided with an aeration and water-retention slow-release layer, a water passage layer, and an aeolian sand filling layer sequentially from inside to outside, a griller being arranged between the aeration and water-retention slow-release layer and the water passage layer, and a griller being arranged between the water passage layer and the aeolian sand filling layer.

Preferably, the first water delivery pipe network includes: first vertical pipes arranged at vertical intervals around an inner wall of a periphery of the first water storage unit and first transverse pipes scattered in a radial pattern in an inner zone of the infiltrating irrigation unit, bottoms of the first vertical pipes being each connected to a bottom of an inner cavity of the first water storage unit, and the first transverse pipes being connected to the first vertical pipes; the second water delivery pipe network includes: a second transverse pipe and a second vertical pipe which are staggered in transverse and longitudinal directions and which are connected to each other, the second transverse pipe being a multi-layer and multi-circle circular pipe arranged in the second water storage unit, the second vertical pipe being arranged perpendicular to the second transverse pipe and connected to a bottom of an inner cavity of the second transverse pipe, and the second transverse pipe being connected to the first water storage unit or the second water storage unit above and adjacent to the second transverse pipe through the second vertical pipe; the third water delivery pipe network includes a third transverse pipe extending from an inner side of the infiltrating irrigation unit to an outermost side thereof, the third transverse pipe being an open pipe with an opening facing downwards.

Preferably, the first water storage unit includes: a guide column cluster in the center of the infiltrating irrigation unit; a bracket for fixing a bottom of the guide column cluster; two semi-circular cover plates, which are openable relative to each other, on a lower side of the guide column cluster; a first flared protrusion in a center of a bottom of the first water storage unit, the first flared protrusion having a plurality of openings at a top end; the second water storage unit is provided with a second flared protrusion in a center of a bottom of the second water storage unit, and except a bottommost second flared protrusion, all other second flared protrusions are provided with a plurality of openings at the top.

Preferably, the top corner of the outer layer protrudes outwards by 1 to 1.5 cm, and a perpendicular distance between opposite sides of the regular hexagon of the outer layer is 5 to 6 cm; an outer contour of a protruding part of the outer layer has an uneven structure, and includes openings with porosity of 65% to 85%; the inner layer has a diameter of 1 cm; and the infiltrating irrigation unit has a height of 10 to 15 cm.

Preferably, the aeration and water-retention slow-release layer includes a mixture of aeolian sand, semi-decomposed sawdust and absorbent fiber in a volume ratio of 5:4:1; the water passage layer is formed by aeolian sand and bamboo-fiber super-absorbent non-woven fabric in a volume ratio of 7:3; the aeolian sand filling layer is filled with aeolian sand; the bamboo-fiber super-absorbent non-woven fabric is a thin strip with a width of 0.2 to 0.5 cm and is evenly laid in a radial pattern from the center to the periphery.

Preferably, the infiltrating irrigation unit has closed structures at its top and bottom, a cover plate is arranged at the top of the infiltrating irrigation unit, and the cover plate has a concave structure inclined from the periphery to the center in a horizontal direction.

Preferably, the guide column cluster is a columnar body with an average diameter of 0.5 to 1.5 mm, and with a diameter of 0.5 mm at the top, gradually increasing to 1.5 mm downwards; the guide column cluster is formed by a plurality of guide columns of 1 to 1.5 cm in length, and the guide columns are arranged in a dense pattern, with a spacing of 2.5 to 5 mm between adjacent guide columns; and the guide column cluster is low in the center and high in the periphery, and with an average height flush with the top of the infiltrating irrigation unit.

Preferably, the first vertical pipe includes a first water delivery pipe and a second water delivery pipe spaced apart from each other; the first water delivery pipe has a pipe diameter of 5 to 10 mm; a length of the first water delivery pipe is 1 to 2 cm smaller than a length of the first water storage unit; the second water delivery pipe has a pipe diameter of 1 to 3 mm, and includes grooves with width and depth of 0.1 to 0.3 mm densely arranged on an inner wall and along a pipe extension direction; the first transverse pipe has a pipe diameter of 0.5 to 1 mm, and one to three first transverse pipes, each of which has a length of 3 to 5 mm, are provided at intervals of 5 to 8 mm in a vertical direction; and the first transverse pipes are arranged with a horizontal inclination of 5 to 8 degrees outwards and downwards; the second transverse pipe is arranged around the second flared protrusion and has a pipe diameter of 3 to 5 mm; a spacing between adjacent circles of the circular pipe in each layer is 3 to 5 mm; the second transverse pipe starts at a distance of 5 to 8 mm from the bottom of the second water storage unit, and one layer of second transverse pipe is provided upwards at intervals of 6 to 10 mm; the second vertical pipe has a pipe diameter of 0.5 to 1 mm, with second vertical pipes arranged at intervals of 3 to 5 mm for each circle of the second transverse pipe; and the second vertical pipes of different layers are arranged in a staggered manner; and the third transverse pipe is arranged with a horizontal inclination of 5 to 8 degrees outwards and downwards and includes grooves with width and depth of 0.1 to 0.3 mm densely arranged on its inner wall and along a pipe extension direction, and a void in the third transverse pipe has a diameter of 0.5 to 1.2 mm.

Preferably, when the ecological conservation water-saving devices are arranged on a green land with a slope gradient of less than 20 degrees, the ecological conservation water-saving devices are arranged perpendicular to a horizontal surface and are arranged at a greater density below a slope surface than above the slope surface; and when the ecological conservation water-saving devices are arranged on a green land with a slope gradient of greater than 20 degrees, the ecological conservation water-saving devices are provided only in a bottom area of the slope surface.

Preferably, when the ecological conservation water-saving devices are arranged near and below a large arbor forest in the urban mass green land, the ecological conservation water-saving devices are arranged in a radial pattern with an arbor as the center, and the ecological conservation water-saving devices are arranged in an area outside one square meter with an arbor canopy as the center.

The networked ecological conservation water-saving system for urban mass green land according to the present disclosure collects and stores irrigation water and rainfall by using the ecological conservation water-saving devices, so that water is slowly realized when the green land needs water, which significantly shortens the irrigation time and frequency, reduces the irrigation water consumption, and solves the problems of large water consumption, resource waste, high maintenance frequency, and high maintenance costs of conventional green land irrigation.

The ecological conservation water-saving system according to the present disclosure can achieve purposes of efficient use of rainwater, reducing rainwater runoff, effectively increasing groundwater supply and saving water resources, and allow the urban mass green land to play an important role in the construction of sponge cities, by installing the ecological conservation water-saving devices in the green land without any modification to the ground and underground structures of the original green land. It can be set up at the initial construction of the lawns, or can be directly applied to the existing lawns, which is a green land water-saving transformation method worthy of promotion.

BRIEF DESCRIPTION OF DRAWINGS

The accompanying drawings illustrated herein are used to provide a further understanding of the present disclosure and constitute a part of the present disclosure. Exemplary embodiments of the present disclosure and the description thereof are used to explain the present disclosure rather than limit the present disclosure. In the accompanying drawings.

DETAILED DESCRIPTION

Technical solutions of the present disclosure will be described in further detail below with reference to the accompanying drawings and embodiments.

The present disclosure provides a networked ecological conservation water-saving system for urban mass green land, which significantly reduces the time and frequency of irrigation and reduces the amount of water for irrigation by using an ecological conservation water-saving device to collect and store irrigation water, precipitation and other water, and slowly release the water when the green land requires water. Preferred embodiments of the present disclosure are illustrated as shown in FIGS. 1 to 4.

Specifically, the networked ecological conservation water-saving system for urban mass green land includes ecological conservation water-saving devices 11, and five to nine ecological conservation water-saving devices 11 are arranged orderly in per square of the urban green land and distributed in a centrosymmetric manner.

Figure 1:
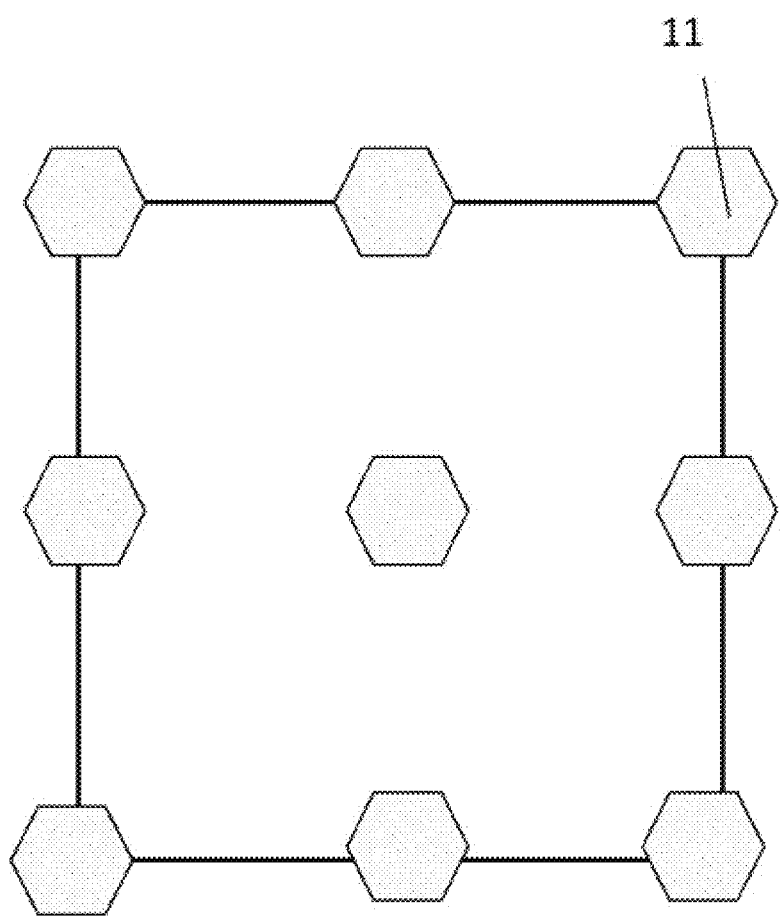
FIG. 1 shows a first example of a networked ecological conservation water-saving system for urban mass green land.
Figure 2:
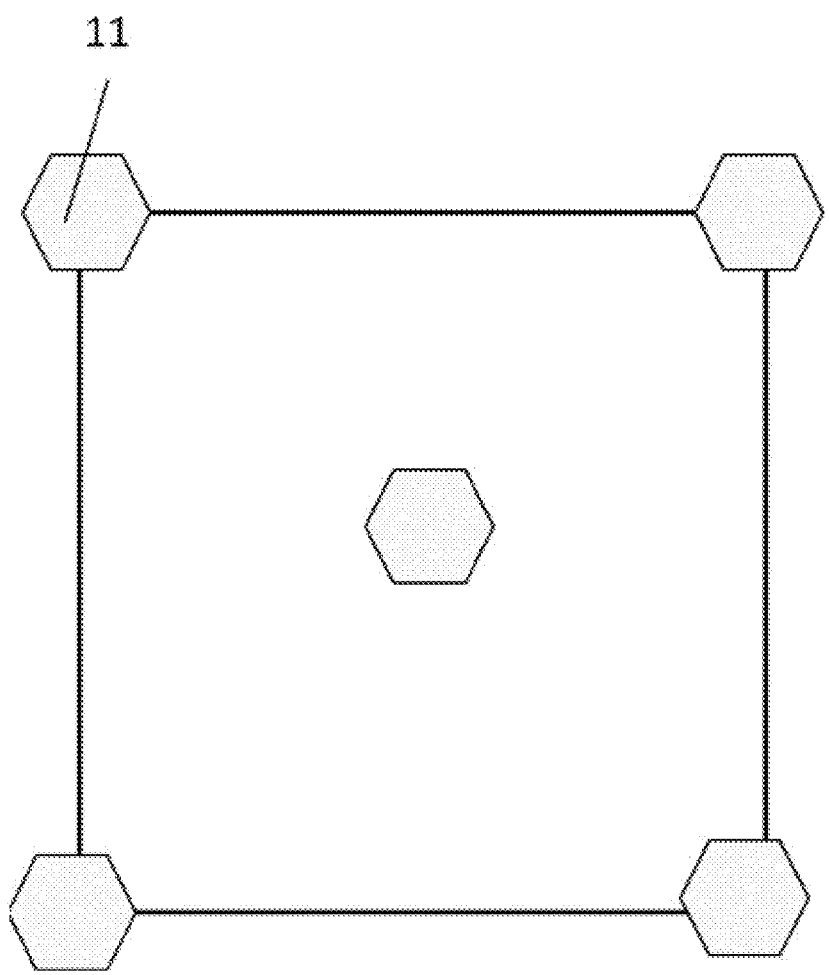
FIG. 2 shows a second example of a networked ecological conservation water-saving system for urban mass green land.

Each ecological conservation water-saving device 11 has a radiant irrigation area of approximately 20 cm². During horizontal establishment of the green land, five to nine ecological conservation water-saving devices are arranged in per square meter to achieve effective coverage. As shown in FIG. 1, for one square meter of a square green land, one ecological conservation water-saving device is arranged at each of four corners, with one at a midpoint of each of four sides, and one at a geometric center point. That is, there are nine ecological conservation water-saving devices in total, of which eight are shared by adjacent green lands except for the one at the center point. In such a way, the entire green land can be fully covered. If an overall irrigation volume of a target green land is medium, as shown in FIG. 2, five ecological conservation water-saving devices may be arranged as required, i.e., four at the four corners and one at the center point, which can meet the irrigation requirement. The devices at each site in the entire green land constitute a grid water-saving system covering the green land, achieving water-saving irrigation for the entire green land.

Preferably, when the ecological conservation water-saving devices 11 are arranged on a green land with a slope gradient of less than 20 degrees, the ecological conservation water-saving devices 11 are arranged perpendicular to a horizontal surface and are arranged at a greater density below a slope surface than above the slope surface. When the ecological conservation water-saving devices 11 are arranged on a green land with a slope gradient of greater than 20 degrees, the ecological conservation water-saving devices 11 are provided only in a bottom area of the slope surface, since the slope surface of the green land with the gradient of greater than 20 degrees is not suitable for installation of the devices.

When the networked ecological conservation water-saving system according to the present disclosure is applied in initial green land construction, positions for the devices may be reserved according to the setting during a laying process of the green land, and the devices may be mounted at the same time together with the green land vegetation. For established green lands, surface vegetation need to be transplanted to other locations according to predetermined positions, and weeds and other debris need to be removed before installation of the devices. For the first use after installation, the irrigation volume can be increased appropriately.

Further, when the ecological conservation water-saving devices 11 are mounted near and below a large arbor forest in the urban green land, the ecological conservation water-saving devices 11 are arranged in a radial pattern with an arbor as the center, and the ecological conservation water-saving devices 11 are arranged in an area outside one square meter with an arbor canopy as the center, that is, no ecological conservation water-saving device 11 is arranged within one square meter with the arbor canopy as the center.

The ecological conservation water-saving device 11 includes a columnar housing with an overall cross-section shaped in a regular hexagon, and an upper part of the columnar housing is provided with an infiltrating irrigation unit 1. The infiltrating irrigation unit 1 is provided with a first water storage unit 2 in its center. A lower part of the first water storage unit 2 is provided with at least one second water storage unit 7 sequentially connected to the first water storage unit 2. The ecological conservation water-saving device 11 further includes a first water delivery pipe network connected to the first water storage unit 2, a second water delivery pipe network connected to the second water storage unit 7, and a third water delivery pipe network arranged within the infiltrating irrigation unit 1.

Figure 3:
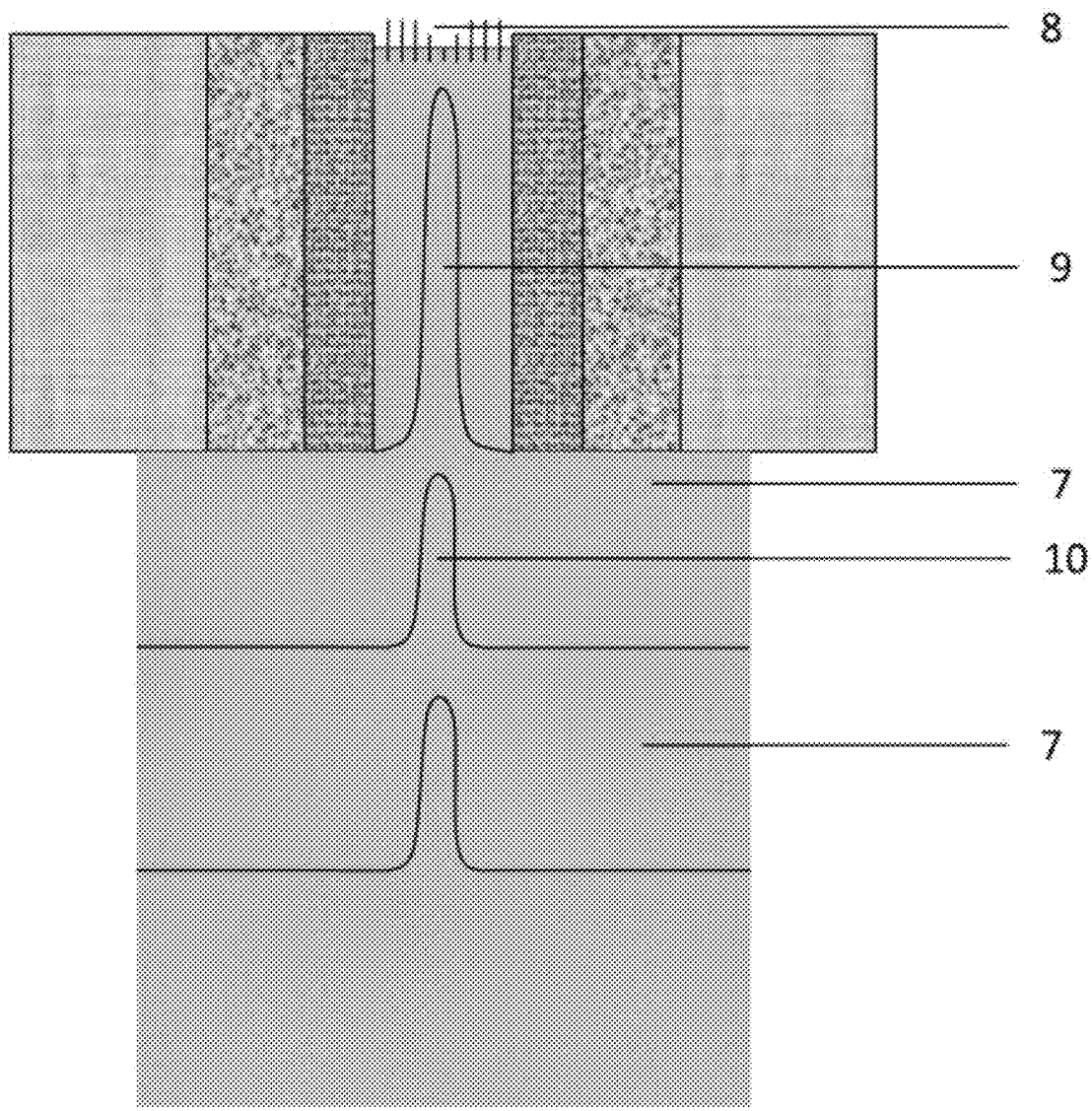
FIG. 3 shows a vertical section of an ecological conservation water-saving device.
Figure 4:
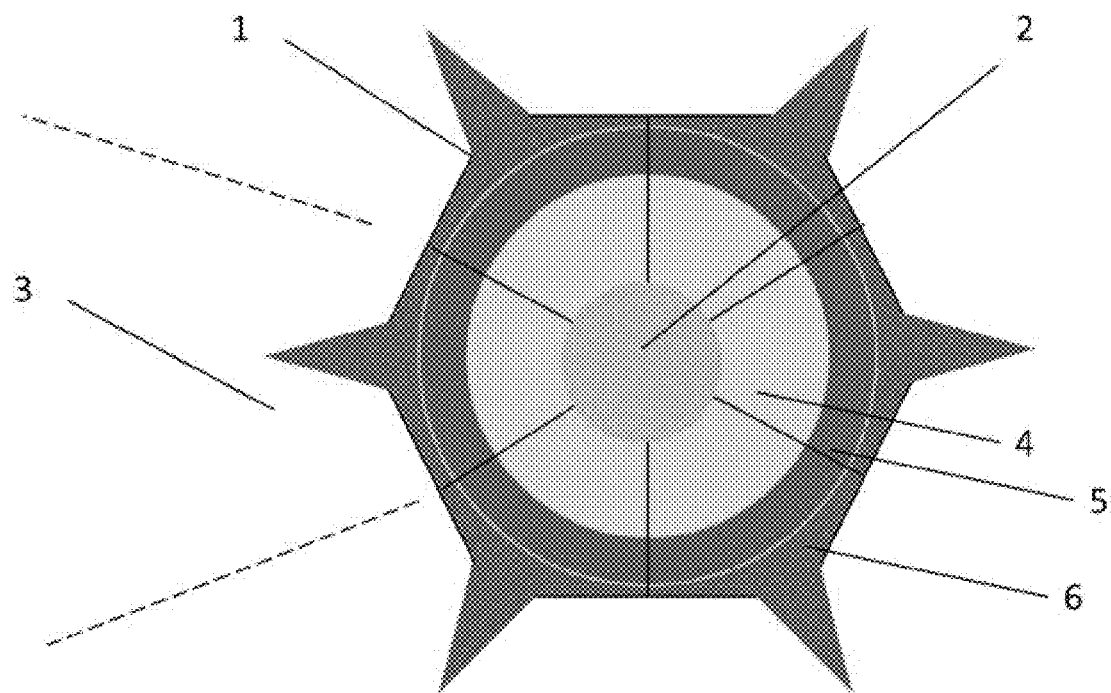
FIG. 4 shows a horizontal section of an ecological conservation water-saving device.

As shown in FIGS. 3 and 4, the infiltrating irrigation unit 1 includes: an outer layer with an outer profile shaped in a regular hexagon and with a top corner protruding outwards; and an inner layer of a hollow cylinder with a geometric center of a hexagonal shape as a circle. The infiltrating irrigation unit 1 is divided into six radiant irrigation zones 3 by perpendicular lines from the geometric center of the cross-section to six sides of the hexagonal shape, and a grille is provided between two adjacent radiant irrigation zones 3. The infiltrating irrigation unit 1 is provided with an aeration and water-retention slow-release layer 4, a water passage layer 5, and an aeolian sand filling layer 6 sequentially from inside to outside; a griller is arranged between the aeration and water-retention slow-release layer 4 and the water passage layer 5; and a griller is arranged between the water passage layer 5 and the aeolian sand filling layer 6.

The first water storage unit 2 includes: a guide column cluster 8 in the center of the infiltrating irrigation unit 1; a bracket for fixing a bottom of the guide column cluster 8; two semi-circular cover plates, which can be opened relative to each other, on a lower side of the guide column cluster 8; a first flared protrusion 9 in the center of the bottom, the first flared protrusion 9 having a plurality of openings at its top end. The second water storage unit 7 is provided with a second flared protrusion 10 in the center of the bottom, and except a bottommost second flared protrusion 10, all other second flared protrusions 10 are provided with a plurality of openings at the top.

The first water storage unit 2 includes: a guide column cluster 8 in the center of the infiltrating irrigation unit 1; a bracket for fixing a bottom of the guide column cluster 8; two semi-circular cover plates, which can be opened relative to each other, on a lower side of the guide column cluster 8; a first flared protrusion 9 in the center of the bottom, the first flared protrusion 9 having a plurality of openings at its top end. The second water storage unit 7 is provided with a second flared protrusion 10 in the center of the bottom, and except a bottommost second flared protrusion 10, all other second flared protrusions 10 are provided with a plurality of openings at the top.

The main structure of the ecological conservation water-saving device 11 according to the present disclosure is a columnar body with a regular hexagonal cross-section. A perpendicular distance between opposite sides of the regular hexagon of the columnar housing is 5 to 6 cm, and a depth of the columnar housing is 15 to 35 cm. The height is set according to the root depth of the lawn, generally about 15 to 20 cm for an initially established lawn, and a completely established lawn may be set to 20 to 35 cm as required. The device is made of water-resistant, corrosion-resistant, pressure-resistant and light-weight materials, such as alloy and polymeric resin materials.

The infiltrating irrigation unit 1 system is located at the top of the device; an outer profile of the system protrudes outwards by 1 to 1.5 cm from the top corner of the regular hexagonal profile of the entire device, with a perpendicular distance of 5 to 6 cm between opposite sides of the hexagon; and an inner profile thereof is a circle with a geometric center of the regular hexagon as a center and with a diameter of 1 cm. The height of the infiltrating irrigation unit 1 ranges from 10 to 15 cm, and depends on the main growth interval of the vegetation roots. For example, an infiltrating irrigation system applied to the completed lawn should select a greater height; an infiltrating irrigation system applied to the initial lawn may select a smaller height; an infiltrating irrigation system applied to a vegetation area with shallow root distribution may select a smaller height.

Further, the infiltrating irrigation unit 1 is divided into six zones by perpendicular lines from the geometric center of the cross-section to six sides, and a grille is provided between two adjacent zones and has an aperture of 1 to 1.5 mm. Each zone corresponds to one radiant irrigation zone 3 towards the outside of the device.

As shown in FIG. 2, two concentric circles are drawn outwards from the geometric center of the cross-section, i.e., the geometric center of the hexagon, with diameters of 1.8 to 2 cm and 2.5 to 2.8 cm respectively. The two concentric circles divide each zone into three layers from the center to the outside. A grille is arranged between layers and has an aperture of 2 to 3 mm. Each layer is filled with different fillers from the inside to the outside. The aeration and water-retention slow-release layer 4 includes a mixture of aeolian sand, semi-decomposed sawdust and absorbent fiber in a volume ratio of 5:4:1. The water passage layer 5 is filled with a mixture of aeolian sand and bamboo-fiber super-absorbent non-woven fabric in a volume ratio of 7:3; the bamboo-fiber super-absorbent non-woven fabric is a thin strip with a width of 0.2 to 0.5 cm and is evenly laid in the zone in a radial pattern from the center to the periphery. The outer layer is an aeolian sand filling layer.

The aeolian sand has a low content of silty clay particles and extremely low surface activity, and is loose and non-cohesive. The sand surface has almost no physical adsorption of water, and the maximum water absorption is less than 1%. The particles can maintain their original skeletal structure after contact with water, and the sand has good water stability. The above characteristics of aeolian sand allow the above three structural layers to form stable and efficient waterway channels through different volume proportions of aeolian sand. The mixture of semi-decomposed sawdust and absorbent fiber on the inner side has good aeration and water retention effect, and can also acts as slow-release fertilizer to provide, along with irrigation water, a certain amount of organic nutrients for green plants. A porous structure of the bamboo fiber forms a good water transport channel and accelerates the transport of water. The system can both transport water from a central storage system to external irrigation zones and transport water from the external irrigation zones to the system for storage during rainfall or irrigation. The above structure can achieve a purpose of two-way water transport.

The outermost infiltrating irrigation unit 1 is a protruding part of the top corner of the outer contour, and the top corner of the outer layer protrudes outwards by 1 to 1.5 cm. As an integral structure with the above outer layer zone, the filler is aeolian sand, the outer contour has an uneven structure, and there are openings with porosity of 65% to 85%. The above design can effectively prevent the soil particles in the irrigation area from blocking the openings, increase the contact area, and effectively absorb and discharge water. Preferably, the top and bottom of the infiltrating irrigation unit 1 are closed, and the top of the infiltrating irrigation unit 1 is provided with a cover plate, and the cover plate has a concave structure inclined from the periphery to the center in a horizontal direction, which can be used as a rainwater collection device to store water in the central water storage system.

As shown in FIG. 1, the infiltrating irrigation unit 1 is provided with the first water storage unit 2 in its center, and the lower part of the first water storage unit 2 is provided with at least one second water storage unit 7 sequentially connected to the first water storage unit 2.

Specifically, the first water storage unit 2 is on an inner side of the infiltrating irrigation unit 1 and is a concentric cylindrical part, at the same height as the infiltrating irrigation unit 1. A guide column cluster 8 are arranged on the top and perpendicular to the horizontal line. The guide column cluster 8 is a columnar body with an average diameter of 0.5 to 1.5 mm, with a diameter of 0.5 mm at the top, gradually increasing to 1.5 mm downwards. The guide column cluster 8 is formed by a plurality of guide columns of 1 to 1.5 cm in length. The guide columns are arranged in a dense pattern, with a spacing of 2.5 to 5 mm between adjacent guide columns. The top height is uneven, with a basic height trend of being low in the center and high in the periphery, and with an average height flush with the top of the water storage system. The bottom of the guide columns is fixed by a horizontal bracket. On the one hand, the structure of the guide columns can destroy the surface tension of water and accelerates the flow; on the other hand, the guide column cluster can intercept leaves, weeds and other debris from entering the water storage system.

Two semi-circular cover plates, which can be opened relative to each other in the middle, are provided underneath the guide column cluster 8. A surface of each cover plate includes a water-resistant coating and can be kept dry. The cover plates are normally closed to reduce the evaporation loss of water in the water storage system. When water drips from the top to the cover plates, the cover plates are opened by gravity.

The center of the bottom of the first water storage unit 2 include a flared protrusion 9, which is an overflow channel of the infiltrating irrigation unit 1. The protrusion has a smooth curve and a highest point in the center. The flared protrusion 9 is arranged at a position 1 to 2 cm below the cover plate. A top end of the flared protrusion 9 has a width of 0.3 to 0.5 cm, and a bottom end of the flared protrusion 9 is integrated with a bottom end of the first water storage unit 2. The second water storage unit 7 has a height of 5 cm, and the second flared protrusion has a height of 4 to 4.5 cm. A bottom end of the second flared protrusion 10 is integrated with a bottom end of the second water storage unit 7.

The second water storage unit 7 is located below the infiltrating irrigation unit 1 and the first water storage unit 2 and has a height of 5 cm. The center of the bottom of the system include a flared protrusion which has a smooth curve, a highest point in the center and a height of about 4 to 4.5 cm. There are a plurality of openings at a top end of the protrusion. When a water level in the second water storage unit 7 rises to the openings, the water flows out from the openings to the second water storage unit 7 at a lower layer. In the present disclosure, more second water storage units 7 may be provided below according to the rainfall and the irrigation requirement of green lands. Except for the first water storage unit 2, the number of remaining lower second water storage units 7 is preferably not more than four.

The first water delivery pipe network includes first vertical pipes arranged at vertical intervals around an inner wall of a periphery of the first water storage unit 2 and first transverse pipes scattered in a radial pattern in an inner zone of the infiltrating irrigation unit 1. Bottoms of the first vertical pipes are each connected to a bottom of an inner cavity of the first water storage unit 2. The first transverse pipes are connected to the first vertical pipes.

Preferably, the first vertical pipes include a first water delivery pipe and a second water delivery pipe spaced apart from each other; the first water delivery pipe has a pipe diameter of 5 to 10 mm; and a length of the first water delivery pipe is 1 to 2 cm smaller than a length of the first water storage unit 2; a water level in such a water delivery pipe is at the same as a water level in the water storage system, and when the water level is high, water is mainly delivered by this water delivery pipe. The second water delivery pipe has a pipe diameter of 1 to 3 mm, and includes grooves with width and depth of 0.1 to 0.3 mm densely arranged on its inner wall and along a pipe extension direction; and such a water delivery pipe can delivery water upwards by capillary action. The pipe diameter of the first transverse pipe is 0.5 to 1 mm, and one to three first transverse pipes, each of which has a length of 3 to 5 mm, are provided at intervals of 5 to 8 mm in the vertical direction. The transverse pipes are horizontally oriented and are scattered in the radial pattern in the inner zone of the infiltrating irrigation unit 1. The first transverse pipes are arranged with a horizontal inclination of 5 to 8 degrees outwards and downwards, and the number of the first transverse pipes increases with the increase in height.

The second water delivery pipe network includes a second transverse pipe and a second vertical pipe which are staggered in transverse and longitudinal directions and which are connected to each other. The second transverse pipe is a multi-layer and multi-circle circular pipe arranged in the second water storage unit 7. The second vertical pipe is arranged perpendicular to the second transverse pipe and connected to a bottom of an inner cavity of the second transverse pipe. The second transverse pipe is connected to the first water storage unit 2 or the second water storage unit 7 above and adjacent to the second transverse pipe through the second vertical pipe.

Specifically, the second transverse pipe is arranged around the second flared protrusion 10 and has a pipe diameter of 3 to 5 mm; and a spacing between adjacent circles of the circular pipe in each layer is 3 to 5 mm. The second transverse pipe starts at a distance of 5 to 8 mm from the bottom of the second water storage unit 7, and one layer of second transverse pipe is provided upwards at intervals of 6 to 10 mm. The second vertical pipe has a pipe diameter of 0.5 to 1 mm, with second vertical pipes arranged at intervals of 3 to 5 mm for each circle of the second transverse pipe. The bottom of each second vertical pipe is connected to the bottom of the inner cavity of the second transverse pipe, the second vertical pipe can connect two adjacent layers of the second transverse pipes, and the second vertical pipes of different layers are arranged in a staggered manner.

The second horizontal pipe on the uppermost layer of each second water storage unit 7 is connected to another second adjacent water storage unit 7, which is above and adjacent to the second horizontal pipe, through the second vertical pipe, to deliver the water from the lower layer to the upper layer.

The water delivery system of the infiltrating irrigation unit 1 is responsible for the two-way delivery of water to the inside and outside of the device. When the water content outside the irrigation area is reduced and there is no external irrigation, the water will be transported from the device to the outside. When the external irrigation or rainfall occurs, the water delivery system can also transport water inwards for water storage. Specifically, the third water delivery pipe network includes a third transverse pipe extending from the inside of the infiltrating irrigation unit 1 to the outermost side. The third transverse pipe is arranged with a horizontal inclination of 5 to 8 degrees outwards and downwards, to facilitate siphon drainage. The third transverse pipe is an open pipe with an opening facing downwards and is an open channel. The third transverse pipe includes grooves with width and depth of 0.1 to 0.3 mm densely arranged on its inner wall and along a pipe extension direction. A void in the third transverse pipe has a diameter of 0.5 to 1.2 mm, water can be sucked from below the pipe into the pipe and conveyed along the grooves. The number of third transverse pipes is set according to irrigation needs.

The networked ecological conservation water-saving system for urban mass green land according to the present disclosure collects and stores irrigation water and rainfall by using the ecological conservation water-saving devices, so that water is slowly realized when the green land needs water, which significantly shortens the irrigation time and frequency, reduces the irrigation water consumption, and solves the problems of large water consumption, resource waste, high maintenance frequency, and high maintenance costs of conventional green land irrigation.

The ecological conservation water-saving system according to the present disclosure can achieve purposes of efficient use of rainwater and saving water resources, by installing the ecological conservation water-saving devices in the green land without any modification to the ground and underground structures of the original green land. It can be set up at the initial construction of the lawns, or can be directly applied to the existing lawns, which is a green land water-saving transformation method worthy of promotion.

The working principle for producing the above technical effects of the ecological conservation water-saving system according to the present disclosure is as follows.

When sprinkler irrigation or rainfall is carried out in green lands, the irrigation water or rainwater will flow into the storage unit through the guide columns at the top of the storage unit or along the top cover covers of the infiltrating irrigation unit; when the outside soil is saturated with water, the water in the soil pores will be drawn into the infiltrating irrigation unit through the infiltrating irrigation structure. When the water level in the first storage unit reaches the overflow opening, excess water will flow from the overflow channel into the second storage unit of the next layer, and so on until the external water supply stops.

When the green land needs irrigation, the water is first transferred from the first storage unit to the infiltrating irrigation unit via the water delivery system, and meanwhile the water is transferred layer by layer from each zone of the infiltrating irrigation unit to the radiant irrigation zone. The water is also transferred outwards from the water delivery transverse pipe inside the infiltrating irrigation unit.

At the same time, the second storage units of the lower layers continuously transport water upwards layer by layer through respective water delivery pipe networks via the capillary action, until reaching the first water storage unit, to ensure that water is available for irrigation.

Finally, it should be noted that the above embodiments are intended to illustrate rather than limit the technical solutions of the present disclosure. Despite the detailed description of the present disclosure with reference to the preferred embodiments, it should be understood by those skilled in the art that modifications to specific embodiments of the present disclosure or equivalent substitutions of some technical features can be made and they can be covered in the scope of the technical solutions claimed in the present disclosure without departing from the spirit of the technical solutions of the present disclosure.

The invention claimed is:

1. A networked ecological conservation water-saving system for urban mass green land, comprising five to nine ecological conservation water-saving devices arranged orderly in per square of the urban mass green land and distributed in a centrosymmetric manner, wherein:
the ecological conservation water-saving device comprises:
a columnar housing with an overall cross-section shaped in a regular hexagon, an upper part of the columnar housing being provided with an infiltrating irrigation unit, a first water storage unit being arranged in a center of the infiltrating irrigation unit, and a lower part of the first water storage unit being provided with at least one second water storage unit sequentially connected to the first water storage unit;
a first water delivery pipe network connected to the first water storage unit;
a second water delivery pipe network connected to the second water storage unit; and
a third water delivery pipe network arranged within the infiltrating irrigation unit,
wherein the infiltrating irrigation unit comprises: an outer layer with an outer profile shaped in a regular hexagon and with a top corner protruding outwards; and an inner layer of a hollow cylinder with a geometric center of a hexagonal shape as a circle;
the infiltrating irrigation unit is divided into six radiant irrigation zones by perpendicular lines from a geometric center of a cross-section to six sides of the regular hexagon, and a grille is provided between two adjacent radiant irrigation zones;
the infiltrating irrigation unit is provided with an aeration and water-retention slow-release layer, a water passage layer, and an aeolian sand filling layer sequentially from inside to outside, a griller being arranged between the aeration and water-retention slow-release layer and the water passage layer, and a griller being arranged between the water passage layer and the aeolian sand filling layer.

2. The networked ecological conservation water-saving system according to claim 1, wherein:
the first water delivery pipe network comprises: first vertical pipes arranged at vertical intervals around an inner wall of a periphery of the first water storage unit and first transverse pipes scattered in a radial pattern in an inner zone of the infiltrating irrigation unit, bottoms of the first vertical pipes being each connected to a bottom of an inner cavity of the first water storage unit, and the first transverse pipes being connected to the first vertical pipes;
the second water delivery pipe network comprises: a second transverse pipe and a second vertical pipe which are staggered in transverse and longitudinal directions and which are connected to each other, the second transverse pipe being a multi-layer and multi-circle circular pipe arranged in the second water storage unit, the second vertical pipe being arranged perpendicular to the second transverse pipe and connected to a bottom of an inner cavity of the second transverse pipe, and the second transverse pipe being connected to the first water storage unit or the second water storage unit above and adjacent to the second transverse pipe through the second vertical pipe; and
the third water delivery pipe network comprises a third transverse pipe extending from an inner side of the infiltrating irrigation unit to an outermost side thereof, the third transverse pipe being an open pipe with an opening facing downwards.

3. The networked ecological conservation water-saving system according to claim 2, wherein:
the first water storage unit comprises: a guide column cluster in the center of the infiltrating irrigation unit; a bracket for fixing a bottom of the guide column cluster; two semi-circular cover plates, which are openable relative to each other, on a lower side of the guide column cluster; and a first flared protrusion in a center of a bottom of the first water storage unit, the first flared protrusion having a plurality of openings at a top end; and
the second water storage unit is provided with a second flared protrusion in a center of a bottom of the second water storage unit, and except a bottommost second flared protrusion, all other second flared protrusions are provided with a plurality of openings at the top.

4. The networked ecological conservation water-saving system according to claim 3, wherein:
the top corner of the outer layer protrudes outwards by 1 to 1.5 cm, and a perpendicular distance between opposite sides of the regular hexagon of the outer layer is 5 to 6 cm;
an outer contour of a protruding part of the outer layer has an uneven structure, and comprises openings with porosity of 65% to 85%;
the inner layer has a diameter of 1 cm; and
the infiltrating irrigation unit has a height of 10 to 15 cm.

5. The networked ecological conservation water-saving system according to claim 3, wherein:
the aeration and water-retention slow-release layer comprises a mixture of aeolian sand, semi-decomposed sawdust and absorbent fiber in a volume ratio of 5:4:1;
the water passage layer is formed by aeolian sand and bamboo-fiber super-absorbent non-woven fabric in a volume ratio of 7:3;
the aeolian sand filling layer is filled with aeolian sand,
wherein the bamboo-fiber super-absorbent non-woven fabric is a thin strip with a width of 0.2 to 0.5 cm and is evenly laid in a radial pattern from the center to the periphery.

6. The networked ecological conservation water-saving system according to claim 3, wherein the infiltrating irrigation unit has closed structures at its top and bottom, a cover plate is arranged at the top of the infiltrating irrigation unit, and the cover plate has a concave structure inclined from the periphery to the center in a horizontal direction.

7. The networked ecological conservation water-saving system according to claim 3, wherein:
the guide column cluster is a columnar body with an average diameter of 0.5 to 1.5 mm, and with a diameter of 0.5 mm at the top, gradually increasing to 1.5 mm downwards;

the guide column cluster is formed by a plurality of guide columns of 1 to 1.5 cm in length, and the guide columns are arranged in a dense pattern, with a spacing of 2.5 to 5 mm between adjacent guide columns; and the guide column cluster is low in the center and high in the periphery, and with an average height flush with the top of the infiltrating irrigation unit.

8. The networked ecological conservation water-saving system according to claim 2, wherein:

the first vertical pipe comprises a first water delivery pipe and a second water delivery pipe spaced apart from each other; the first water delivery pipe has a pipe diameter of 5 to 10 mm; a length of the first water delivery pipe is 1 to 2 cm smaller than a length of the first water storage unit; the second water delivery pipe has a pipe diameter of 1 to 3 mm, and comprises grooves with width and depth of 0.1 to 0.3 mm densely arranged on an inner wall and along a pipe extension direction; the first transverse pipe has a pipe diameter of 0.5 to 1 mm, and one to three first transverse pipes, each of which has a length of 3 to 5 mm, are provided at intervals of 5 to 8 mm in a vertical direction; and the first transverse pipes are arranged with a horizontal inclination of 5 to 8 degrees outwards and downwards;

the second transverse pipe is arranged around the second flared protrusion and has a pipe diameter of 3 to 5 mm; a spacing between adjacent circles of the circular pipe in each layer is 3 to 5 mm; the second transverse pipe starts at a distance of 5 to 8 mm from the bottom of the second water storage unit, and one layer of second transverse pipe is provided upwards at intervals of 6 to 10 mm; the second vertical pipe has a pipe diameter of 0.5 to 1 mm, with second vertical pipes arranged at intervals of 3 to 5 mm for each circle of the second transverse pipe; and the second vertical pipes of different layers are arranged in a staggered manner; and the third transverse pipe is arranged with a horizontal inclination of 5 to 8 degrees outwards and downwards and comprises grooves with width and depth of 0.1 to 0.3 mm densely arranged on its inner wall and along a pipe extension direction, and a void in the third transverse pipe has a diameter of 0.5 to 1.2 mm.

9. The networked ecological conservation water-saving system according to claim 1, wherein:

when the ecological conservation water-saving devices are arranged on a green land with a slope gradient of less than 20 degrees, the ecological conservation water-saving devices are arranged perpendicular to a horizontal surface and are arranged at a greater density below a slope surface than above the slope surface; and when the ecological conservation water-saving devices are arranged on a green land with a slope gradient of greater than 20 degrees, the ecological conservation water-saving devices are provided only in a bottom area of the slope surface.

10. The networked ecological conservation water-saving system according to claim 1, wherein when the ecological conservation water-saving devices are arranged near and below a large arbor forest in the urban mass green land, the ecological conservation water-saving devices are arranged in a radial pattern with an arbor as the center, and the ecological conservation water-saving devices are arranged in an area outside one square meter with an arbor canopy as the center.

* * * * *